(12) United States Patent
Rompa

(10) Patent No.: US 7,121,066 B2
(45) Date of Patent: Oct. 17, 2006

(54) INSTALLATION FOR SLICING AND PACKAGING BREAD

(75) Inventor: Jozef Johannes Theresia Rompa, Oosterhout (NL)

(73) Assignee: Rompa Patent Beheer B.V. (NL)

( * ) Notice: Subject to any disclaimer, the term of this patent is extended or adjusted under 35 U.S.C. 154(b) by 0 days.

(21) Appl. No.: 10/223,691

(22) Filed: Aug. 20, 2002

(65) Prior Publication Data

US 2003/0037516 A1 Feb. 27, 2003

Related U.S. Application Data

(63) Continuation of application No. PCT/NL01/00145, filed on Feb. 20, 2001.

(30) Foreign Application Priority Data

Feb. 29, 2000 (NL) .................................. 1014519

(51) Int. Cl.
*A21C 15/04* (2006.01)

(52) U.S. Cl. ............................. 53/516; 53/513; 53/514; 53/544; 53/570; 198/457.01; 198/611; 198/803.16

(58) Field of Classification Search .................. 53/513, 53/514, 516, 201, 247, 252, 258, 570, 544; 198/457.01, 803.16, 611
See application file for complete search history.

(56) References Cited

U.S. PATENT DOCUMENTS

| | | | |
|---|---|---|---|
| 2,211,433 A | * 8/1940 | Papendick | 83/105 |
| 2,332,316 A | * 10/1943 | Hexter et al. | 53/516 |
| 4,481,752 A | * 11/1984 | Sabel | 53/448 |
| 4,512,137 A | 4/1985 | Koberlein | 53/435 |
| 5,265,400 A | * 11/1993 | Roberts et al. | 53/500 |
| 5,680,743 A | 10/1997 | Hoekzema | 53/446 |
| 5,743,071 A | 4/1998 | Wolthuizen | 53/571 |
| 6,401,435 B1 | * 6/2002 | Kilby et al. | 53/448 |

FOREIGN PATENT DOCUMENTS

EP 0 734 950 A1 10/1996
NL 1001892 8/1996

\* cited by examiner

*Primary Examiner*—Scott A. Smith
*Assistant Examiner*—Gloria R Weeks
(74) *Attorney, Agent, or Firm*—Blank Rome LLP

(57) ABSTRACT

An installation for slicing whole loaves and packaging each sliced loaf in its entirety or in halves after splitting of the loaf that has been sliced in its entirety.

The installation comprises a slicing device for slicing whole loaves, and a packaging device which is disposed downstream of the slicing device and is suitable both for packaging a sliced loaf in its entirety and for packaging sliced half loaves. Splitting means are disposed downstream of the slicing device, for splitting a sliced whole loaf into a first and a second half.

Adjacent and separate first and second conveyor paths are provided between the slicing device and the packaging device, for conveying the first half and the second half respectively of a sliced loaf.

A positioning device is further disposed between the slicing device and the packaging device, which positioning device is designed to turn round a first half of a sliced loaf arriving at the positioning device by way of the first conveyor path and to place said half in the same orientation on the second conveyor path as a second half of a sliced loaf arriving at the positioning device by way of said second conveyor path.

16 Claims, 3 Drawing Sheets

US 7,121,066 B2

INSTALLATION FOR SLICING AND PACKAGING BREAD

CROSS REFERENCE TO RELATED APPLICATIONS

This is a continuation application of PCT/NL01/00145 filed 20 Feb. 2001, which claims the priority of Dutch patent application number 1014519 filed 29 Feb. 2000, both herein incorporated by reference.

FIELD OF THE INVENTION

The invention relates to an installation for slicing whole loaves and subsequently packaging each sliced loaf in its entirety or in halves after splitting of the loaf that has been sliced in its entirety. The invention further relates to a positioning installation, which installation can form part of the abovementioned complete installation for slicing and packaging sliced bread.

BACKGROUND OF THE INVENTION

An installation for slicing whole loaves and subsequently packaging each sliced loaf in its entirety or in halves after splitting of the loaf that has been sliced in its entirety is generally known and is described as prior art in U.S. Pat. No. 5,680,743. In the case of said known installation the whole loaves coming out of the oven are first sliced and then packaged. If there is demand for packaged, sliced half loaves, a bakery worker takes up a position between the slicing device and the packaging device. The worker then manually removes half of a sliced loaf from the one conveyor path and subsequently places the half loaf on the other conveyor path in the same orientation as that of the half loaves that are being carried on that conveyor path to the place where the worker is positioned.

Manually taking hold of and turning round half a loaf and then placing it on another conveyor path can be performed only at very low speed, is expensive in view of the wage costs, and also constitutes an unappealing activity for the worker.

U.S. Pat. No. 5,680,743 therefore proposes—if there is demand for packed, sliced half loaves—first cutting a whole, unsliced loaf coming out of the oven into two halves using a single cutter blade, and then placing the two halves of the loaf one behind the other and conveying them to a slicing device, where the half loaves are then cut into slices. In order to ensure that the half loaves follow one another after the whole loaf has been cut in half, U.S. Pat. No. 5,680,743 discloses a positioning device with a horizontal turntable and with a centre guide, which forms an appropriate path for each half of the loaf that has been cut in two. The centre guide extends in line with the single cutter blade, viewed in the direction of conveyance of the loaves, and runs until above the turntable. If one of the loaf halves goes onto the turntable, that half is carried along and taken to the other conveyor path. In the process, that half of the loaf is rotated and ultimately lies in front of the other half of the loaf. A pushing element then carries the two halves to the slicing device, where the half loaves are cut into slices.

The installation according to U.S. Pat. No. 5,680,743 is not satisfactory. A particular disadvantage is that only half of the slicing capacity of the slicing device for slicing the bread is utilized. This is a particular disadvantage because in practice the slicing device is generally the limiting factor for the capacity of the entire slicing and packaging installation. Furthermore, slicing of the already halved loaves leads to an undesirably great loss of bread material.

OBJECT OF THE INVENTION

The object of the present invention is to provide an improved installation that eliminates the above-mentioned disadvantages.

SUMMARY OF THE INVENTION

The invention provides an installation, wherein a positioning device is disposed between the slicing device and the packaging device, which positioning device is designed to turn round a first half of a sliced loaf arriving at the positioning device by way of the first conveyor path, and to place said half in the same orientation on the second conveyor path as a second half of a sliced loaf arriving at the positioning device by way of said second conveyor path.

The invention thus provides for a whole loaf first to be sliced in its entirety and subsequently divided into two halves. If there is demand for whole sliced loaves, the two halves are combined again at the packaging installation (or earlier). If there is demand for sliced half loaves, the positioning device is put into operation.

The positioning device preferably comprises a set of clamping jaws, which are designed to grip between them the first half of a sliced loaf to be turned round, which clamping jaws are fitted on a support that is movable in such a way that in a first position of the support the clamping jaws assume a position for receiving the first half that is being fed in by way of the first conveyor path, and in such a way that in a second position of the support the clamping jaws assume a position for discharging the turned first half by way of the second conveyor path.

The clamping jaws preferably grip the already sliced half loaf at its end faces, i.e. at its ends situated transversely to the direction of conveyance.

A slight clamping force is adequate for the clamping, so that the loaf is not damaged.

The clamping ensures that the sliced half loaf does not fall apart when it is being moved to the other conveyor path.

The invention further provides a positioning installation, which can be placed, for example, between an existing slicing device and packaging device, and the invention provides a positioning device for sliced half loaves.

The invention will be explained in greater detail below with reference to the drawing.

DETAILED DESCRIPTION OF A PREFERRED EMBODIMENT

Figure 1:
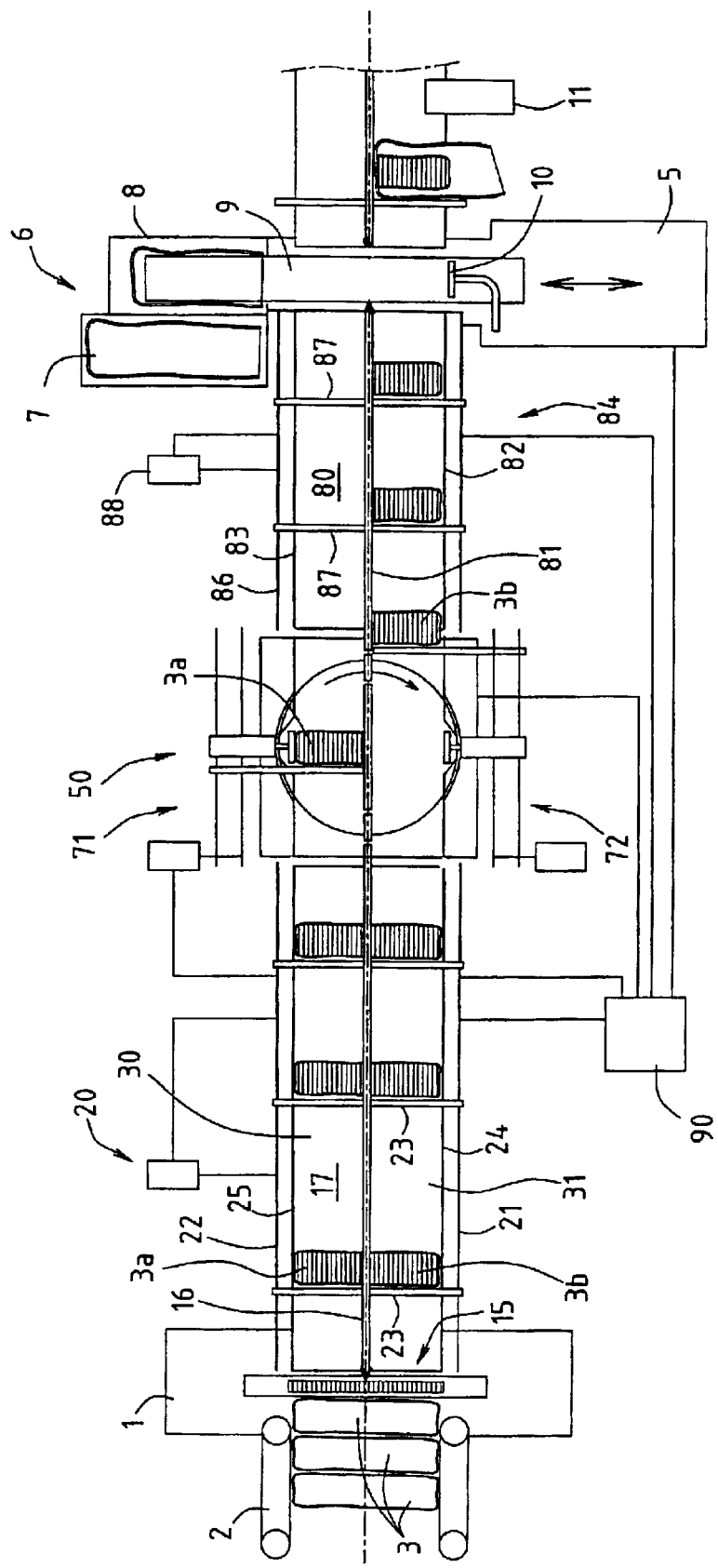
FIG. 1 shows diagrammatically in top view the layout of an installation according to the invention.

FIG. 1 shows an installation for slicing whole loaves and subsequently packaging each sliced loaf in its entirety or in halves after the loaf sliced in its entirety has been split.

The installation comprises a slicing device 1 for slicing whole loaves 3 that have been brought in on a conveyor means 2. The slicing device 1 can be provided with, for example, one or more cutter blade supports that move up and down, each support containing several cutter blades disposed next to one another. An example of this is described in WO 98/41368. It could, however, be a different type of slicing device, for example a band slicer.

A packaging device 5 is disposed downstream of the slicing device 1, which packaging device is suitable both for packaging a sliced loaf in its entirety and for packaging sliced half loaves.

The packaging device 5 is equipped here for packaging whole or half loaves in (plastic) bags. The device 5 has a magazine 6 with a stock of bags 7 for whole loaves and a stock of bags 8 for half loaves.

The packaging device 5 is, for example, of the type described in WO 93/21068. This type has a scoop assembly with a bottom scoop and a top scoop, which assembly is movable to and fro transversely to the direction of conveyance of the loaves to be packaged. The loaf to be packaged then goes onto the bottom scoop 9, while a bag 7, 8 is stretched around the bottom and top scoops. On the return stroke the loaf goes against a retainer 10, which slides the loaf into the bag 7, 8. The scoops are subsequently moved out of the bag, and the bag 7, 8 filled with bread is discharged. The filled bags are sealed at a sealing device 11.

Disposed downstream of the slicing device 1, in line with one of the slicing elements of the slicing device 1 are splitting means 15 for splitting a sliced whole loaf 3 into a first half 3a and a second half 3b.

The splitting means 15 are formed here by the bevelled edge of a centre guide 16, which extends along the central axis of a stationary sliding surface 17 at a slight distance from the latter.

The loaf halves 3a, 3b are pushed along said sliding surface 17 by means of a first pushing device 20. Said pushing device 20 here comprises an endless chain 21, 22 or the like on each longitudinal side of the sliding surface 17, and push rods 23 fitted at a distance from each other on the chains 21. These push rods 23 run through underneath the centre guide 16, transversely to the direction of conveyance of the loaf halves 3a, 3b.

A side guide 24, 25 extends parallel to the centre guide 16 on each side of the latter, so that a loaf half 3a, 3b is guided in each case between a side guide 24, 25 and the centre guide 16. The distance between a side guide 24, 25 and the centre guide 16 is preferably adjustable, since loaves can be of different lengths and the way in which they are split is not always the same either. The position of the centre guide 16 relative to the slicing device 1 may also be adjustable.

The assembly of the sliding surface 17 and the guides 16, 24, 25 respectively forms a part of a first conveyor path 30 for the first half 3a and a part of a second conveyor path 31 for the second half 3b. The corresponding pushing device 20 brings about the movement of the loaf halves 3a, 3b.

The installation further comprises a positioning device 50, disposed between the slicing device 1 and the packaging device 5. Said device 50 is designed here to turn round a first half 3a of a sliced loaf arriving by way of the first conveyor path 30 at the positioning device 50, and to place it on the second conveyor path 31 in the same orientation as a second half 3b of a sliced loaf arriving by way of said second conveyor path 31 at the positioning device 50.

Figure 2:
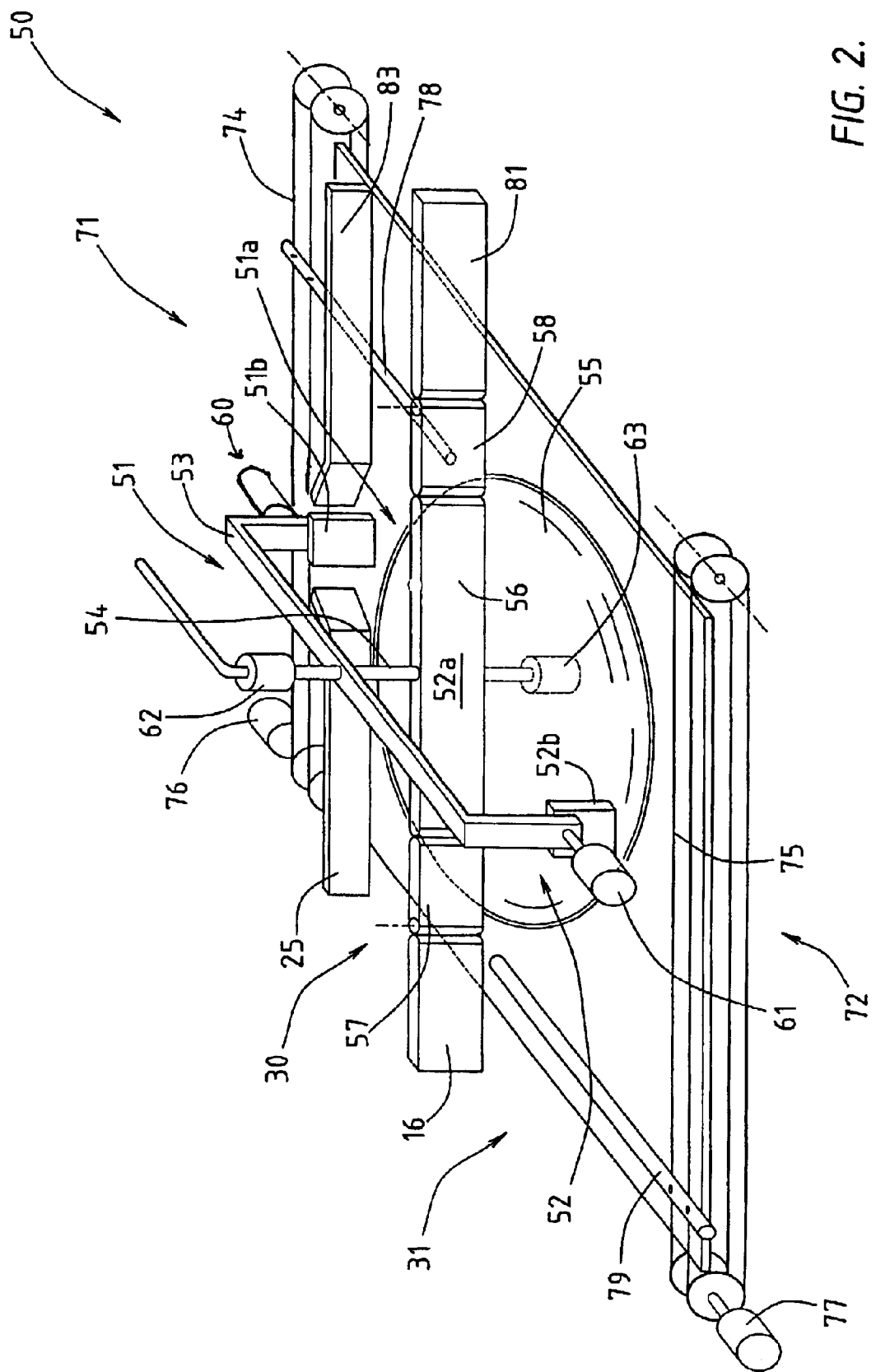
FIG. 2 shows in perspective the positioning device according to the invention, which forms part of the installation of FIG. 1.

The positioning device 50 will be described in greater detail further on, in particular with reference to FIG. 2.

Separate first displacement means 71 and second displacement means 72 are provided at the positioning device 50, for respectively moving past the positioning device 50 a sliced half loaf 3a by way of the first conveyor path 30 and a sliced half loaf 3b—or 3a if the positioning device is utilized—by way of the second conveyor path 31.

If there is demand for packaged sliced whole loaves, the two halves 3a, 3b of a loaf are guided next to each other past the non-operational positioning device 50 with the aid of the displacement means 71, 72. If there is demand for packaged sliced half loaves 3a, 3b, the positioning device 50 is put into operation.

Downstream of the positioning device 50 a following sliding surface 80, with a centre guide 81 and side guides 82, 83, can be seen. A corresponding second pushing device 84 with endless chains 85, 86 and corresponding push rods 87 can also be seen. The pushing device 84 has a drive motor 88, which permits an adjustable speed of the pushing device 84. In a preferred embodiment, provision is made for the pushing device 84 to be synchronized with the packaging device 5.

The layout of the positioning device 50 and its operation in combination with the displacement means 71, 72, will now be explained with reference to FIGS. 1 and 2.

The positioning device 50 comprises two sets of clamping jaws 51, 52, each set having two clamping jaws 51a, 51b, 52a, 52b.

The clamping jaws 51b, 52b are fitted on an arm 53, which is fixed in the centre on a vertical rotary shaft 54.

A circular platform 55 is also fixed on the rotary shaft 54. The platform 55 serves as a supporting and sliding surface for the sliced half loaves 3a, 3b.

The arm 53 is situated at such a distance above the platform 55 that the half loaves 3a, 3b can pass through underneath it.

The clamping jaws 51a, 52a are immovably fixed on the platform 55. In the embodiment shown, the clamping jaws 51a, 52a are formed by the upright side faces of a vertical plate 56, extending in the plane of the rotary shaft 54. In a certain position of the platform 55, the plate 56 can extend in line with the centre guides 16 and 81.

A swivelling flap 57, 58 is provided on the end of each of the centre guides 16, 81 that faces the plate 56. On the side of the adjacent centre guide 16, 81, said flaps 57, 58 can each be swivelled about a corresponding vertical hinge axis. A drive for swivelling each of the flaps 57, 58 in a suitable manner when the device 50 is in operation is preferably provided.

A pneumatic cylinder 60, 61 is fixed on each end of the arm 53, each cylinder bearing its own clamping jaw 51b, 52b that is movable by the cylinder 60, 61. By appropriate operation of the cylinders 60, 61, a sliced half loaf 3a can be gripped with an adjustable clamping pressure. Each cylinder 60, 61 is connected by way of a line containing a rotatable coupling 62 to a source (not shown) for supplying compressed air. The coupling 62 is situated above this on the rotary shaft 54. By appropriate adjustment of the pneumatic pressure, a half loaf can be gripped sufficiently to prevent it from falling apart, without the loaf being damaged by the clamping operation.

The rotary shaft 54 is rotatably mounted in a frame (not shown) of the device 50, which frame can be placed on the ground.

An electric motor 63 with corresponding electronic control means is provided for rotation of the rotary shaft 54 and the arm 53 and platform 55 fixed to said shaft. The output shaft of the electric motor 63 is directly connected here to the rotary shaft 54.

By suitable control of said electric motor 63, the rotary shaft 54 can be taken into a first position, in which a set of clamping jaws assumes a position at the first conveyor path 30 to receive the first loaf half 3a, brought in by way of the first conveyor path 30. After said loaf half 3a has been gripped with the clamping jaws, the rotary shaft 54 can then be rotated through 180°, in such a way that the clamping jaws—with the gripped loaf half—in a second position of the rotary shaft assume a position in the path of the second conveyor path 31, so that the now turned first half 3a can be discharged by way of the second conveyor path 31. At that moment the other set of clamping jaws is again in the path of the first conveyor path 30, in order to receive a subsequent first loaf half 3a.

The displacement means 70, 71 are preferably designed in such a way that a second loaf half 3b of a sliced loaf is conveyed past the positioning device 50, and the first half 3a of said sliced loaf is taken between a set of clamping jaws, in order to be gripped and turned. Of course, it is also conceivable for just the second half 3b to be gripped and turned.

The displacement means 70, 71 and the positioning device 50 preferably operate in such a way that—after the first half 3a has been gripped—the first half 3a is not turned and taken into the path of the second conveyor path 31 until after the second half 3b has been taken past the semi-circular path of the first half 3a to be turned. In other words, the object is for the second half 3b, which is not to be turned, to be moved without delay, possibly in an accelerated manner past the positioning device 50, and for the corresponding first half 3a to be placed after the second half 3b, viewed in the direction of forward movement. During the turning of the first half 3a, said first half 3a is situated on the platform 55 between the clamping jaws.

The first and second displacement means 71, 72 here each comprise two endless chains 74, 75, extending next to each other and along a side edge of each conveyor path 30, 31. A separately controllable drive motor 76, 77 is provided for each set of chains 74, 75.

Several pushing elements 78, 79 are provided for each set of chains 74, 75, the pushing elements in each case being connected to both chains at one end and being unsupported at the other end.

The pushing elements 78, 79 can pass at a distance above the platform 55, in order to push a sliced half loaf 3a forward. The pushing elements 78, 79 can move along underneath the side guides 24, 25, 82, 83 and also pass between the platform 55 and the clamping jaws 51b, 52b supported by the arm 53.

The installation is provided with a main control unit 90, which is operationally connected to the slicing device 1, the first and second pushing devices 20, 80, the displacement means 71, 72, the positioning device 50, and the packaging device 5.

Since the length of the loaves to be processed can vary considerably in practice, provision can be made for the position of the drive elements, in this example the cylinders 60, 61, of the clamping jaws 51b, 52b supported by the arm 53 to be adjustable relative to the rotary shaft 54. As a result, the working stroke length of said drive elements can remain limited.

It is also preferable for the positioning device 50 to be capable of being adapted to the width of the loaves to be processed. In practice, that width can vary considerably. In particular, this adjustment is carried out with a view to clamping the sliced half loaf that is to be turned round.

For this reason, provision is made for the place at which a pushing element is stopped—for the purpose of clamping the loaf half being pushed forward by said pushing element between a set of clamping jaws of the positioning device 50—to be adjustable depending on the width of the loaf. Optimum clamping of the loaf can be achieved in this way.

The adaptation to the width of the loaf can also be carried out in order to ensure that the loaf half that has been turned round by the positioning device 50, after being released from the grip, is gradually brought to speed by the pushing element then acting upon said loaf half. To that end, it is preferable for that pushing element to be stopped at such a point that the turned loaf half lies against or virtually against said pushing element after that loaf half has been turned round. By subsequently—after the grip has been released—gradually setting in motion said pushing element, the loaf half is also gradually brought up to speed. This ensures that a sudden acceleration of said loaf half is prevented, and the risk of the loaf falling apart is therefore reduced.

If there is a changeover from packaging sliced half loaves 3a, 3b to packaging whole loaves 3, the main control unit 90 causes the supply of loaves 3 to the slicing device 1 to cease temporarily until all half loaves 3a, 3b in the installation have been packaged. Thereafter, loaves are sliced again and taken to the packaging device 5, without the positioning device 50 being utilized in the process.

It will be clear that it is also possible by means of the positioning device 50 to take sliced half loaves from the path 31 to the path 30 and to place them in the same orientation as the half loaves being supplied by way of said path 30.

Figure 3:
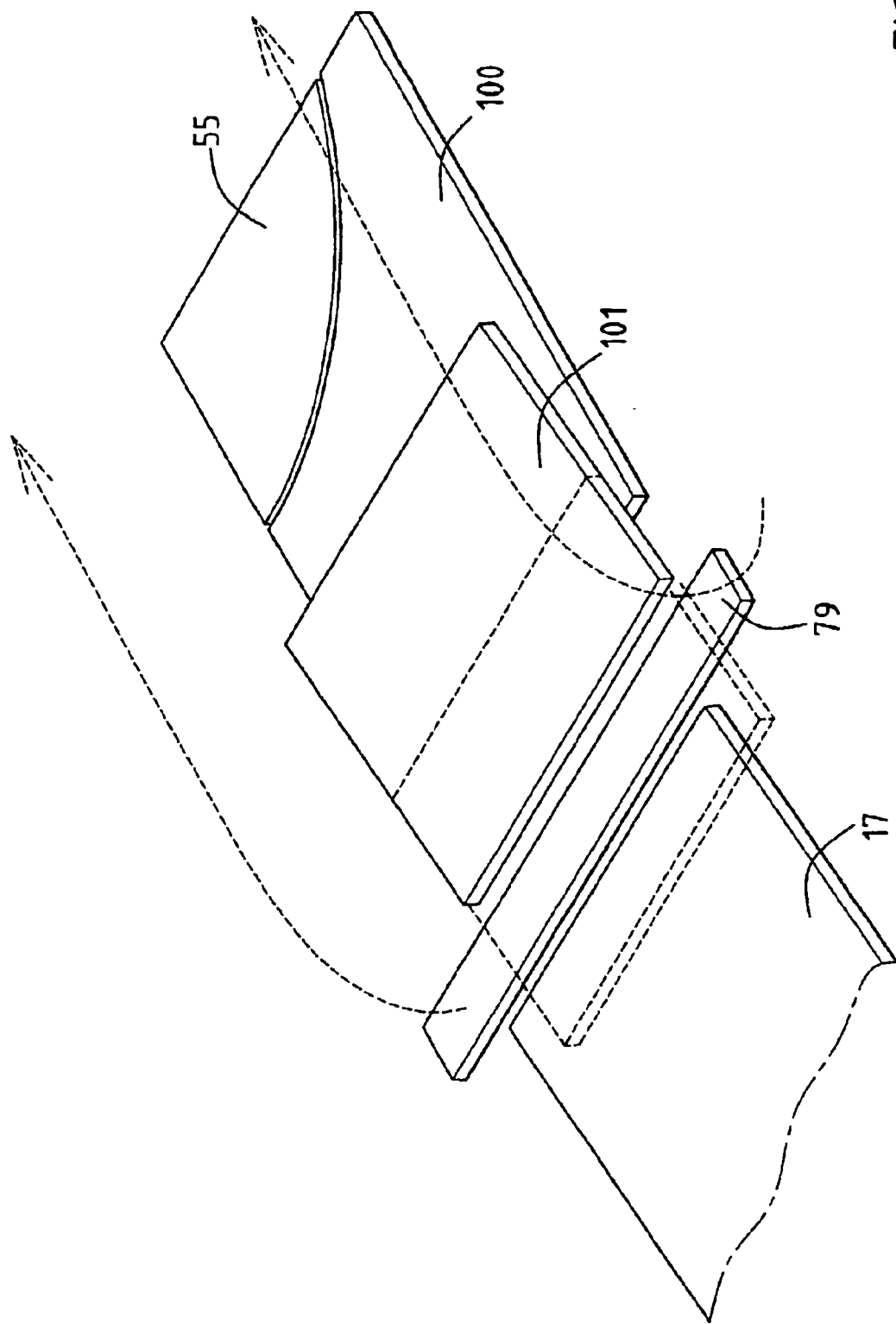
FIG. 3 shows diagrammatically in perspective a detail of the installation of FIG. 1.

FIG. 3 shows an advantageous detail of the installation. The already described sliding surface 17, a pushing element 79 and the platform 55 can be seen. Around the rotary platform 55 is a stationary table 100 with a circular aperture for the platform 55 and a more or less rectangular outer periphery.

As mentioned, the pushing element 79 moves along the top of the platform 55 and the table 100, preferably at some distance, for example a few centimetres. This has the advantage that it avoids the risk that, on account of the rounded edge of the loaf, the pushing element 79 may move through underneath the loaf, and the loaf may not be taken along with it.

In order to move the pushing element 79 upwards from a position below the level of the table 100, a gap is necessary between the sliding surface 17 and the table 100. Furthermore, the pushing element 79 must go behind the loaf that is to be pushed forward. In order to achieve that, provision is made for a plate 101 which moves to and fro, and which in one position covers the gap and then provides space for the accommodation of a loaf coming from the surface 17, and in another position clears the gap in such a way that the pushing element 79 can pass through it. These two positions are shown in FIG. 3. A drive (not shown) is provided for the to and fro movement, said drive preferably being connected to the drive of the pushing element 79.

The construction shown in FIG. 3 can be used in any situation in which bread or the like is being transferred from the one movement device to a movement device with pushing elements which have to go from underneath behind the loaf that is to be pushed forward.

The installation described here can operate at high capacity to slice whole loaves and subsequently deliver them as packaged half loaves. In practice, values in the region of 50 to 70 half loaves per minute have already been achieved.

What is claimed is:

1. An installation for slicing whole loaves and packaging each sliced loaf in its entirety or in halves after splitting of the loaf that has been sliced in its entirety, comprising:

a slicing device comprising multiple cutter members for slicing whole loaves, a packaging device which is disposed downstream of the slicing device and is suitable both for packaging a sliced loaf in its entirety and for packaging sliced half loaves;

a splitting means disposed downstream of the slicing device for splitting a sliced whole loaf into a first and a second half, adjacent and separate first and second conveyor paths provided between the slicing device and the packaging devices, for conveying the first half and the second half respectively of a sliced loaf, and wherein a positioning device is disposed between the slicing device and the packaging device, in which the positioning device is adapted to turn a first half of a sliced loaf arriving at the positioning device by way of the first conveyor path, and to place said half in the same orientation on the second conveyor path as a second half of a sliced loaf arriving at the positioning device by way of said second conveyor path.

2. An installation according to claim 1, in which separate first and second displacement means are provided at the positioning device, for respectively moving a sliced half loaf past the positioning device by way of the first conveyor path and by way of the second conveyor path.

3. An installation according to claim 2, in which the first and second displacement means comprise pushing elements which are equipped to push a sliced half loaf forward along a conveyance surface.

4. An installation according to claim 3, in which an endless drivable chain, with pushing elements directed transversely thereto and passing above the conveyance surface extends along a side edge of each conveyor path, at least in a stretch near the positioning device.

5. An installation for slicing whole loaves and packaging each sliced loaf in its entirety or in halves after splitting of the loaf that has been sliced in its entirety, comprising:

a slicing device for slicing whole loaves, a packaging device which is disposed downstream of the slicing device and is suitable both for packaging a sliced loaf in its entirety and for packaging sliced half loaves;

a splitting means disposed downstream of the slicing device for splitting a sliced whole loaf into a first and a second half;

adjacent and separate first and second conveyor paths provided between the slicing device and the packaging device, for conveying the first half and the second half respectively of a sliced loaf, wherein a positioning device is disposed between the slicing device and the packaging device, in which the positioning device is adapted to turn a first half of a sliced loaf arriving at the positioning device by way of the first conveyor path, and to place said half in the same orientation on the second conveyor path as a second half of a sliced loaf arriving at the positioning device by way of said second conveyor path, and wherein the positioning device comprises at least one set of clamping jaws, in which the clamping jaws are designed to grip between them the first half of a sliced loaf to be turned, and further in which the clamping jaws are fitted on a support structure that is movable in such a way that in a first position of the support structure the clamping jaws assume a position for receiving the first half that is being brought in by way of the first conveyor path, and in such a way that in a second position of the support structure the clamping jaws assume a position for discharging the turned first half by way of the second conveyor path.

6. An installation according to claim 5, in which the support structure is rotatable about a corresponding and substantially vertical rotary shaft.

7. An installation according to claim 5, in which the support structure is rotatable about a corresponding and substantially vertical rotary shaft, which rotary shaft is situated between the two conveyor paths.

8. An installation according to claim 5, in which the support structure is rotatable about a corresponding and substantially vertical rotary shaft, and in which the positioning device has two sets of clamping jaws which are disposed substantially diametrically relative to the rotary shaft, so that the one set of clamping jaws is situated in the path of the first conveyor path when the other set of clamping jaws is situated in the path of the second conveyor path.

9. An installation according to claim 5, in which each set of clamping jaws comprises a fixed clamping jaw and a movable clamping jaw with corresponding clamping pressure setting means.

10. An installation according to claim 5, in which each set of clamping jaws comprises a fixed clamping jaw and a movable clamping jaw with corresponding clamping pressure setting means, and in which the clamping pressure setting means comprise a clamping jaw actuator operated by a pressure medium.

11. An installation according to claim 5, in which the positioning device comprises a platform on which a half of a sliced loaf that is to be turned can stand between a set of clamping jaws.

12. An installation according to claim 5, in which a drive means is provided for rotating the support structure.

13. An installation for slicing whole loaves and packaging each sliced loaf in its entirety or in halves after splitting of the loaf that has been sliced in its entirety, comprising:

a slicing device for slicing whole loaves, a packaging device which is disposed downstream of the slicing device and is suitable both for packaging a sliced loaf in its entirety and for packaging sliced half loaves;

a splitting means disposed downstream of the slicing device for splitting a sliced whole loaf into a first and a second half;

adjacent and separate first and second conveyor paths provided between the slicing device and the packaging device for conveying the first half and the second half respectively of a sliced loaf, wherein a positioning device is disposed between the slicing device and the packaging device, in which the positioning device is adapted to turn a first half of a sliced loaf arriving at the positioning device by way of the first conveyor path, and to place said half in the same orientation on the second conveyor path as a second half of a sliced loaf arriving at the positioning device by way of said second conveyor path, and wherein separate first and second displacement means are provided at the positioning device, for respectively moving a sliced half loaf past the positioning device by way of the first conveyor path and by way of the second conveyor path, and in which the displacement means are designed to convey the second half of a sliced loaf past the positioning device, and to take the first half of said sliced loaf between the clamping jaws, and the positioning device is designed—after the first half has been gripped—to turn the first half and take it into the path of the second displacement means after the second half has been taken past the path of the first half that is to be turned.

14. An installation for slicing whole loaves and packaging each sliced loaf in its entirety or in halves after splitting of the loaf that has been sliced in its entirety, comprising:

a slicing device for slicing whole loaves, a packaging device which is disposed downstream of the slicing device and is suitable both for packaging a sliced loaf in its entirety and for packaging sliced half loaves;

a splitting means disposed downstream of the slicing device for splitting a sliced whole loaf into a first and a second half;

adjacent and separate first and second conveyor paths provided between the slicing device and the packaging device for conveying the first half and the second half respectively of a sliced loaf, wherein a positioning device is disposed between the slicing device and the packaging device, in which the positioning device is adapted to turn a first half of a sliced loaf arriving at the positioning device by way of the first conveyor path, and to place said half in the same orientation on the second conveyor path as a second half of a sliced loaf arriving at the positioning device by way of said second conveyor path, and wherein the installation is provided with a main control unit, which is operationally connected to the slicing device, the displacement means, the positioning device and the packaging device, and in which if there is a changeover from packaging sliced half loaves to packaging whole loaves, the main control unit stops the supply of loaves to the slicing device temporarily until all half loaves in the installation have been packaged.

15. A positioning installation which can be disposed between a slicing device having multiple cutter members for slicing whole loaves, and a packaging device which is disposed downstream of the slicing device and is suitable both for packaging a sliced loaf in its entirety and for packaging sliced half loaves, which positioning installation comprises:

splitting means disposed downstream of the slicing device, for splitting a sliced whole loaf into a first and second half, adjacent and separate first and second conveyor paths that can be disposed between the slicing device and the packaging device, for conveying the first half and the second half respectively of a sliced loaf, a positioning device that can be disposed between the slicing device and the packaging device, in which the positioning device is designed to turn a first half of a sliced loaf arriving the positioning device by way of the first conveyor path, and place said half in the same orientation on the second conveyor path as a second half of a sliced loaf arriving at the positioning device by way of said second conveyor path.

16. An installation for slicing whole loaves and packaging each sliced loaf in its entirety or in halves after splitting of the loaf that has been sliced in its entirety, comprising:

a slicing device for slicing whole loaves, a packaging device which is disposed downstream of the slicing device and is suitable both for packaging a sliced loaf in its entirety and for packaging sliced half loaves;

a splitting means disposed downstream of the slicing device for splitting a sliced whole loaf into a first and a second half;

adjacent and separate first and second conveyor paths provided between the slicing device and the packaging device; for conveying the first half and the second half respectively of a sliced loaf, wherein a positioning device is disposed between the slicing device and the packaging device, in which the positioning device is adapted to turn a first half of a sliced loaf arriving at the positioning device by way of the first conveyor path, and to place said half in the same orientation on the second conveyor path as a second half of a sliced loaf arriving at the positioning device by way of said second conveyor path, and wherein the positioning device comprises at least one set of clamping jaws, which clamping jaws are designed to grip between them the first half of a sliced loaf that is to be turned, which clamping jaws are fitted on a support structure that is movable in such a way that in a first position of the support structure the clamping jaws assume a position for receiving the first half brought in by way of the first conveyor path, and in such a way that in a second position of the support structure the clamping jaws assume a position for discharging the turned first half by way of the second conveyor path.

* * * * *